Figure 1:
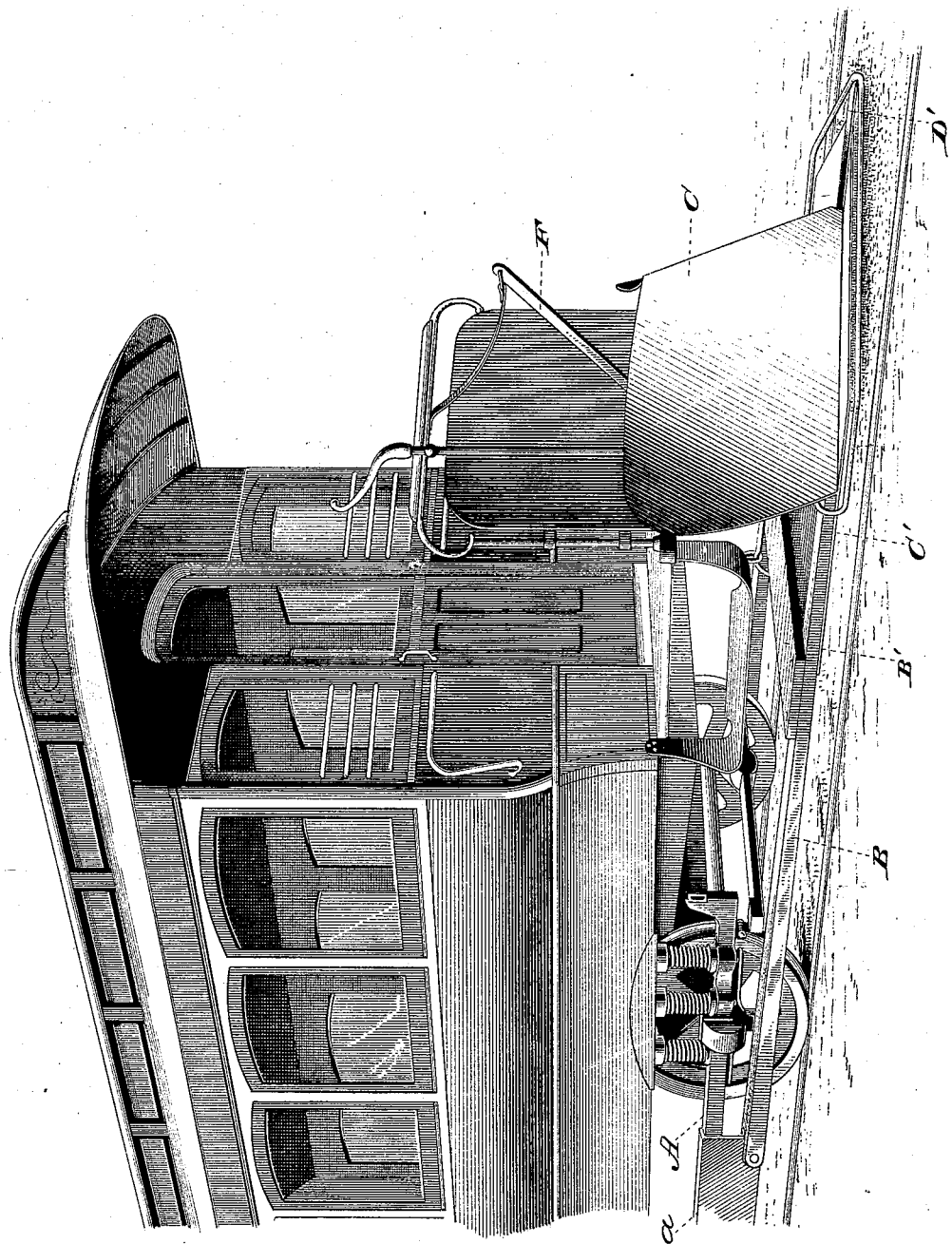

(No Model.)  3 Sheets—Sheet 1.

G. LUNDBERG & C. H. MATTICE.
FENDER FOR STREET CARS.

No. 534,114.  Patented Feb. 12, 1895.

WITNESSES
G. S. Elliott
E. W. Johnson

INVENTORS
Gustave Lundberg
Charles H. Mattice by _____ Attorney (No Model.) 3 Sheets—Sheet 2.
G. LUNDBERG & C. H. MATTICE.
FENDER FOR STREET CARS.
No. 534,114. Patented Feb. 12, 1895.
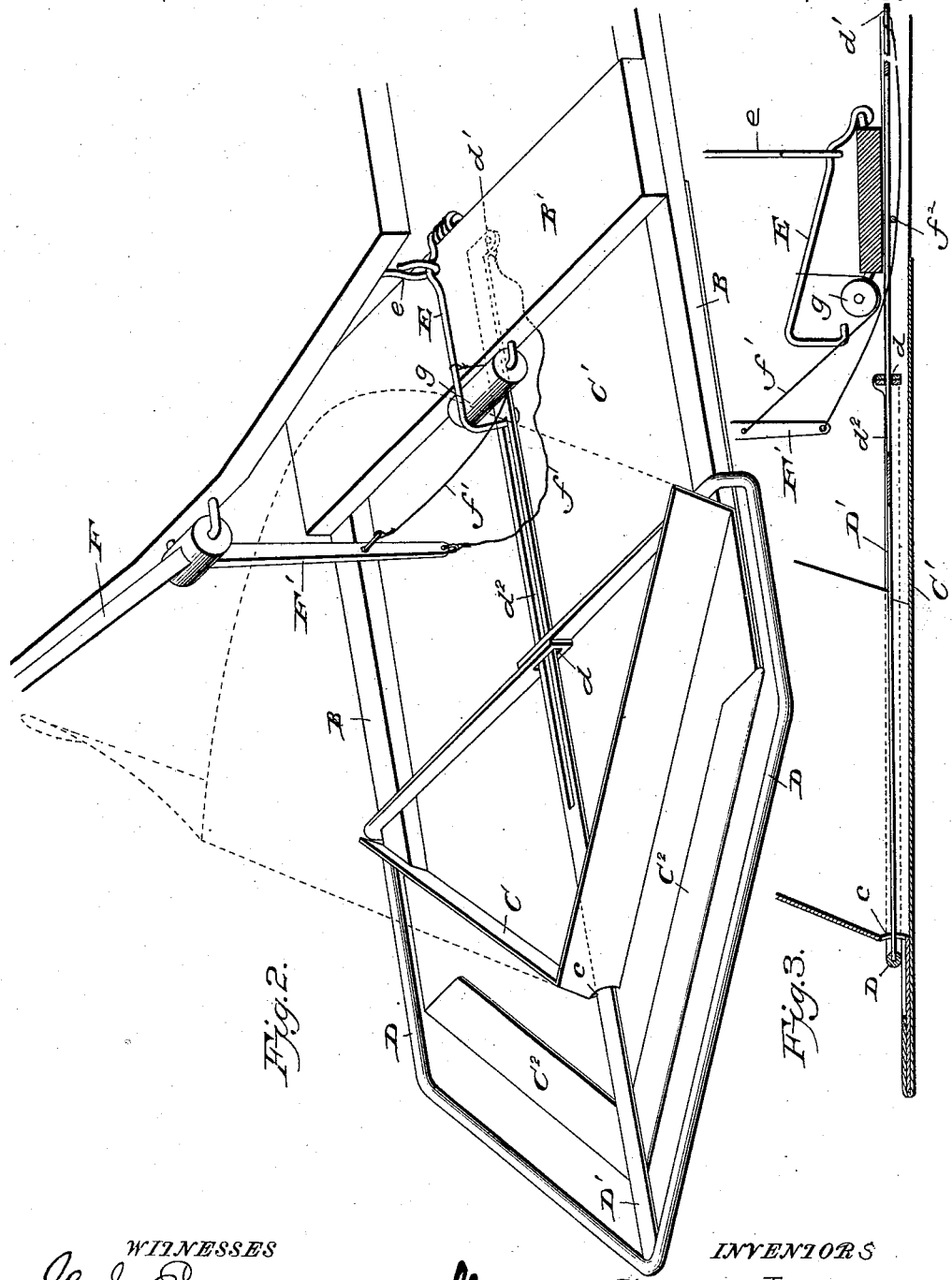
WITNESSES
L. S. Elliott
E. W. Johnson
INVENTORS
Gustave Lundberg
Charles H. Mattice
by
Attorney (No Model.) 3 Sheets—Sheet 3.
G. LUNDBERG & C. H. MATTICE.
FENDER FOR STREET CARS.
No. 534,114. Patented Feb. 12, 1895.
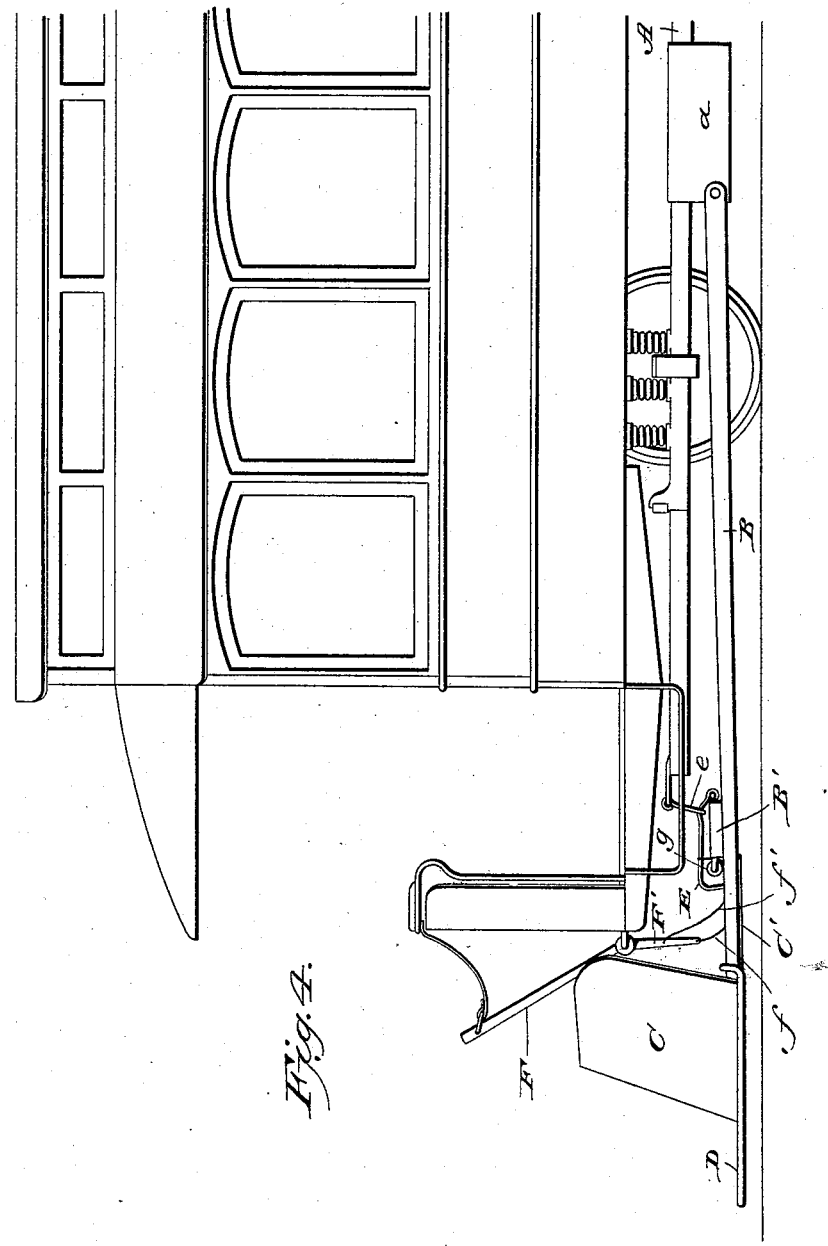
WITNESSES
INVENTORS
Gustave Lundberg
Charles H. Mattice
by _____ Attorney

UNITED STATES PATENT OFFICE.

GUSTAVE LUNDBERG AND CHARLES H. MATTICE, OF WEST TROY, NEW YORK.

FENDER FOR STREET-CARS.

SPECIFICATION forming part of Letters Patent No. 534,114, dated February 12, 1895.

Application filed November 1, 1894. Serial No. 527,672. (No model.)

*To all whom it may concern:*

Be it known that we, GUSTAVE LUNDBERG and CHARLES H. MATTICE, citizens of the United States of America, residing at West Troy, in the county of Albany and State of New York, have invented certain new and useful Improvements in Fenders for Street-Cars; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a street-car with a fender of improved construction which is pivotally connected to the truck of the car and is provided with means which project in front of the fender so that when said means come in contact with an obstruction it will be moved rearwardly and trip a catch and permit the fender to fall so as to rest upon or be in close proximity with the track.

The invention also embodies means for projecting the tripping mechanism, raising the fender and retaining the same in an elevated position.

The invention consists in the construction and combination of the parts, as will be hereinafter fully set forth and particularly pointed out in the claims.

In the accompanying drawings, forming part of this specification, Figure 1 is a perspective view showing the application of our invention to a street-car. Fig. 2 is a perspective view with a portion of the fender removed, the parts being shown retained in an elevated position. Fig. 3 is a sectional view showing the trip-bar retracted and the fender lowered, and Fig. 4 is a side elevation.

A A designate the side bars of the truck-frame of a car to which are adjustably attached suitable plates $a$ for the purpose of providing means for connecting thereto bars B which support the fender C.

The bars B are attached to the truck so as to be positioned beneath the axle-boxes and on the outer side of the wheels so as to form an efficient guard for the wheels. The bars B B are connected to each other at an intermediate point by a transverse board B', and to the forward ends of the bars is attached a plate C' to which the fender is secured in the manner hereinafter described.

The fender C is of the plow type and the lower edges of the wings are bent outward to provide flanges which rest upon the upper side of the plate C' and are secured thereon by rivets, said rivets also passing through the overlapping portions of the plate C' and is bent at its forward end to overlie the flanges. This construction provides the fender with a rounded front edge and with a ledge of sufficient width to support any object which may rest thereon.

The specific construction of the fender hereinbefore described possesses certain features of advantage, among which may be mentioned that having a flat bottom plate C' of sheet metal and wings of the same material there is a certain amount of resiliency or spring which will aid in preventing serious injury to a person that may be struck by the same, and owing to the thickness of the front part of the fender where the wings are secured to the bottom plate great rigidity is given to this part sufficient to permit the device to withstand rough usage and contact with objects that may be upon the track.

The fender attached to the car-truck as shown and described is an efficient protection in itself without auxiliary appliances, as it can be fixedly supported by the truck so as to move therewith in close proximity to the track where there are no projecting portions above the latter; but in a majority of instances it is desired that the fender should be carried at a considerable distance above the rails, and in order that this may be effectively accomplished we provide a trip device which consists of a bar or frame D the front portion of which is of substantially the same configuration as the forward end of the fender and the side members extend parallel with the bars B their rear portions being bent over the bars B and extended inward and connected to a central longitudinal bar D' which passes through apertures $d$ therein.

The bar D' is secured to the forward end of the frame D and passes rearwardly through an opening c in the fender, its rear end being formed into an eye d' with which engages a flexible connection for moving the same longitudinally. The rear end of the bar D' passes through a loop $f^2$ secured to the under side of the board B' and the intermediate portion of said bar is provided with a longitudinal slot $d^2$ through which is adapted to pass a hook E which engages with the bar at the rear end of the slot, said hook being secured at its rear end to the rear edge of the board B', the connection being preferably made by bending the rear end of the hook into a coil which engages with a staple. The hook E is engaged by a link e which is supported by the truck. By this arrangement when the hook E is in engagement with the bar D' the forward end of the fender will be held in an elevated position, and when the bar is moved rearward by contact with the frame D the hook will be disengaged and permit the fender to fall.

F designates a lever which is pivoted to the forward end of the platform of the car and is provided with a depending member F' to which is connected the flexible connection f secured to the rear end of the bar D', and also a flexible connection f' which is attached to the hook E and passes under a roller g mounted on a staple secured in the front edge of the board B'. This lever and its connections are provided for projecting the bar D' and causing the hook E to engage with the same and support the fender in an elevated position.

From the foregoing description it will be obvious that should a person be upon the track he would be first struck by the frame or trip-bar D which would move the bar D' rearwardly to release the fender and permit it to fall so that there would not be any possible chance of the person being caught under the fender and entangled with the car, and should the person be thrown to one side the bars B will act as an effective wheel fender.

Having thus described our invention we do not wish to be limited to the special construction of the parts herein shown, but reserve the right to modify the invention as it may be necessary to adapt the same to car-trucks of different styles. It will also be noted that this device is attached to the truck of the car, and the connections between the car body and fender are of a flexible nature.

We claim—

1. In a fender for street cars, the combination, of supporting bars which are pivotally connected to the truck of the car rear of the front wheels, said bars extending beyond the truck frame and carrying a fender, means for supporting the fender in an elevated position carried by the car truck, and a releasing device carried by the car body and provided with flexible connections which extend from said releasing device to the means which hold the fender elevated, substantially as shown and for the purpose set forth.

2. In a fender for street-cars, the combination, of supporting bars attached to the car-truck, a plate attached to the under side of the supporting bars and wings carried by the plate rear of the front edge thereof to provide a ledge in front of the wings, said ledge having a triple thickness at its forward edge formed by the plates and flanges of the wings, substantially as shown and described.

3. A fender for street cars comprised of a rigid projecting base portion and side wings of resilient sheet-metal, the lower edge of the side wings being attached to the rigid projecting portion, and means for connecting the same to a car, substantially as shown.

4. In a car fender, the combination, of a fender and tripping device supported by the car-truck, of a link carried by the car-truck through which passes a hook, said hook being pivotally attached at one end to a cross-bar while the other end engages with the trip-bar, the hook being in advance of the point of connection of the supporting bars with the truck, substantially as shown and for the purpose set forth.

5. In a fender for street-cars, the combination, of a fender mounted on a plate which is carried by side bars, said side bars being pivoted to the truck-frame at a point rear of the front axle, a transverse board connecting the bars to each other at a point in front of the axle, said board carrying a hook which engages with a link carried by the car-truck, the forward portion of the hook engaging with a bar which is connected to the trip-bar for the purpose of disengaging the front portion of the fender from its support when the trip-bar is retracted, substantially as shown and for the purpose set forth.

6. In a fender for cars, the combination, of the supporting bars pivoted to the truck rear of the front wheels, a transverse board connecting the supporting bars in advance of the wheels, a plate attached to the forward end of the supporting bars so as to project beyond the front ends of the same, and wings carried by the plate, together with a hook pivoted to the transverse board, a roller carried by said board, a trip-bar supported by the fender and transverse board and adapted to be projected in front of the fender, and a lever carried by the car, said lever having flexible connections which extend to the rear end of the sliding bar and to the hook, substantially as shown and for the purpose set forth.

7. In a car-fender, the combination, of a plate C' suitably supported, wings carried by said plate, a trip-bar or frame bent to conform to the shape of the forward end of the fender, the part D' of the trip-bar or frame passing through the fender and engaging with a hook attached to a transverse board secured to the supporting bars, said hook also engaging with a link carried by the car-truck to provide means for supporting the forward part of the fender, substantially as shown and for the purpose set forth.

8. In combination with a car fender, pivotal supports therefor, a transverse board connecting said bars and provided with a hook or catch for supporting the forward portion of the fender, a link which engages with the hook, said link being carried by the car-truck at a point of greater elevation and in advance of the pivotal connection between the rear end of the supporting bar and the truck, substantially as shown.

In testimony whereof we affix our signatures in presence of two witnesses.

GUSTAVE LUNDBERG.
    CHARLES H. MATTICE.

Witnesses:
 JACOB L. ROWE,
 JAMES C. MCINTYRE.